(No Model.)

J. H. PIPHER & D. STRINGFELLOW.
WASHER.

No. 535,019. Patented Mar. 5, 1895.

Witnesses
Julius E. Wolke Jr.
N. P. Wiley

Inventors
John H. Pipher
Dudley Stringfellow.
By their Attorneys
C. A. Snow & Co.

THE NORRIS PETERS CO., PHOTO-LITHO., WASHINGTON, D. C.

UNITED STATES PATENT OFFICE.

JOHN H. PIPHER AND DUDLEY STRINGFELLOW, OF PARKER'S LANDING, PENNSYLVANIA.

WASHER.

SPECIFICATION forming part of Letters Patent No. 535,019, dated March 5, 1895.

Application filed September 30, 1893. Serial No. 486,899. (No model.)

*To all whom it may concern:*

Be it known that we, JOHN H. PIPHER and DUDLEY STRINGFELLOW, citizens of the United States, residing at Parker's Landing, in the county of Armstrong and State of Pennsylvania, have invented a new and useful Washer, of which the following is a specification.

The invention relates to improvements in washers.

The object of the present invention is to improve the construction of washers and to provide one which will be especially adapted for spindles of vehicle axles, and which will be capable of withstanding a great amount of wear, and which will be tough and not brittle.

The invention consists in the construction and novel combination and arrangement of parts hereinafter fully described, illustrated in the accompanying drawings, and pointed out in the claim hereto appended.

Figure 1:
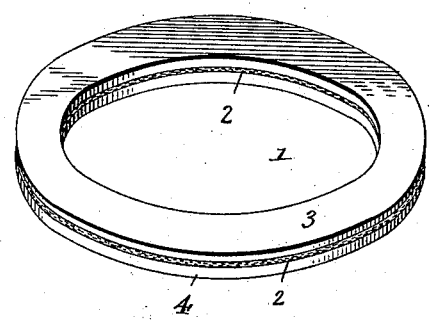
Figure 2:
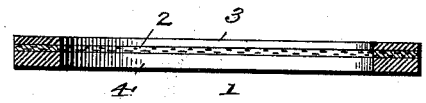

In the drawings—Figure 1 is a perspective view of a washer constructed in accordance with this invention. Fig. 2 is a transverse sectional view.

Like numerals of reference indicate corresponding parts in both figures of the drawings.

1 designates a washer adapted to be employed on spindles of vehicle axles to take up the wear, and consisting of an inner ring or layer of fabric 2, such as canvas, or the like, and outer layers of hard rubber or rubber compound 3 and 4 arranged on each face of the fabric layer.

The several layers of the washer are arranged flat against each other and are of the same dimensions, the intermediate layer of fabric coming flush with the layers of rubber and being exposed at the inner and outer edges of the washer for a purpose that will be well understood.

The washer is vulcanized, and is exceedingly hard, and the fabric contributes toughness and strength to the washer and prevents the same being brittle.

The degree of hardness present in the washer especially adapts it to be employed on spindles of vehicle axles to take up the wear, and for this purpose it will be found to possess great durability, and it is capable of withstanding for a great length of time the wear incident to its use.

It will be readily apparent that the washer is inexpensive and simple in its construction, that it possesses to a high degree hardness and durability, and that it is especially adapted to be employed on spindles of vehicle axles.

The material for the rubber of the washer may be of any of the known compounds used in the manufacture of hard rubber, or valcanite, such as rubber and litharge, red lead, clay, &c.

What we claim is—

As an improved article of manufacture, an axle washer consisting of an unbroken flat ring or annulus, composed of three layers, the central one being fabric and the exterior ones on each side thereof of hard rubber or rubber compound, all vulcanized together, said washer having the plies at its internal and external peripheries substantially coincident, as set forth.

In testimony that we claim the foregoing as our own we have hereto affixed our signatures in the presence of two witnesses.

JOHN H. PIPHER.
DUDLEY STRINGFELLOW.

Witnesses:
GEORGE W. RAMSEY,
JOHN KANIPP.